US012783347B2

(12) United States Patent
Zwerg

(10) Patent No.: US 12,783,347 B2
(45) Date of Patent: Nov. 3, 2026

(54) DIRECT MEMORY ACCESS CONTROLLER FOR DETECTING TRANSIENT FAULTS

(71) Applicant: TEXAS INSTRUMENTS INCORPORATED, Dallas, TX (US)

(72) Inventor: Michael Zwerg, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 50 days.

(21) Appl. No.: 18/924,562

(22) Filed: Oct. 23, 2024

(65) Prior Publication Data

US 2025/0291672 A1 Sep. 18, 2025

Related U.S. Application Data

(60) Provisional application No. 63/566,463, filed on Mar. 18, 2024.

(51) Int. Cl.
*G06F 11/10* (2006.01)

(52) U.S. Cl.
CPC ................................ *G06F 11/1004* (2013.01)

(58) Field of Classification Search
CPC .................................................. G06F 11/1004
See application file for complete search history.

(56) References Cited

U.S. PATENT DOCUMENTS

2014/0108869 A1 4/2014 Brewerton
2018/0293129 A1 10/2018 Aberl
2021/0006353 A1 1/2021 Hoermaier
2024/0070018 A1* 2/2024 Leconte .............. G06F 13/4004

OTHER PUBLICATIONS

International Search Report and Written Opinion mailed Jun. 26, 2025, PCT Application No. PCT/US2025/020321, 10 pages.

* cited by examiner

*Primary Examiner* — Joseph D Torres
(74) *Attorney, Agent, or Firm* — Michelle F. Murray; Charles F. Koch

(57) ABSTRACT

In one example embodiment, a technique for performing a data integrity process is provided. The technique first includes accessing address data stored in a first location in memory such that the address data is indicative of a second location in memory. The technique then includes accessing data stored in the second location in memory and generating a data integrity value based on the accessed data. Once generated, the technique includes performing a comparison between the data integrity value and a reference value associated with the accessed data. If the comparison shows the data integrity value matches the reference value, then the technique includes outputting a positive indication. Else, the technique includes outputting a negative indication.

14 Claims, 6 Drawing Sheets

DIRECT MEMORY ACCESS CONTROLLER FOR DETECTING TRANSIENT FAULTS

RELATED APPLICATIONS

This application is related to, and claims the benefit of priority to, U.S. Provisional Application No. 63/566,463, filed on Mar. 18, 2024, which is hereby incorporated by reference in its entirety.

TECHNICAL FIELD

Aspects of the disclosure are related to the field of computing hardware, and in particular, to detecting transient faults within computing systems.

BACKGROUND

Transient faults, also referred to as soft faults, represent temporary faults that appear in computing systems. For example, a transient fault may be representative of a bit-flip caused by alpha-particle radiation, an error within a flop-based function, or other faults of the like. Typically, transient faults are resolved via a system reset. For example, if a bit-flip occurred in a storage element of a computing system, then power to the computing system may be disconnected, and eventually reestablished, to restore the flipped bits to their original values. Unfortunately, detecting transient faults in computing systems can be both difficult and costly.

Current methods for detecting transient faults may rely on hardware or software of the computing system. For example, hardware-based solutions may utilize dedicated parity bits or an error correction code (ECC) to detect various transient faults. However, current hardware-based solutions fail to provide a method for detecting errors within the flop-based functions of the system. Furthermore, current hardware-based solutions add redundancy to the system and are thus expensive.

As a result, most computing systems rely on software-based solutions for maintaining transient faults. For example, a computing system may configure the central processing unit (CPU) to periodically check for transient faults within memory. Problematically, such solutions may consume significant CPU execution cycles on various data movement operations.

SUMMARY

Disclosed herein is technology, including systems, methods, and devices for managing transient faults within computing systems. In various implementations, a direct memory access (DMA) controller configured to maintain the integrity of data stored in memory is provided.

In one example embodiment, the DMA controller is first configured to access address data from a first location in memory, such that the address data is indicative of a second location in memory. For example, the address data may be indicative of a memory mapped register (MMR) location. Next, the DMA controller is configured to access data stored by the second location in memory. For example, the DMA controller may access MMR data from the second location in memory. Finally, the DMA controller is configured to transfer the data to a third location in memory, such that the third location in memory represents an input to signature generation circuitry.

The signature generation circuitry is representative of circuitry configured to generate a data integrity value with respect to the provided data. For example, the signature generation circuitry may be representative of cyclic redundancy check (CRC) circuitry, that when triggered by the DMA controller, is configured to generate a CRC value based on the provided data and output the CRC value to processing circuitry configured to execute a data integrity process. The data integrity process is representative of a method for identifying transient faults within the storage elements of a system.

In an implementation, to execute the data integrity process, the processing circuitry is first configured to perform a comparison between the data integrity value and a reference value. For example, the processing circuitry may perform a comparison between the CRC value and a corresponding golden signature. Next the processing circuitry outputs an indication of the comparison. If the comparison shows the data integrity value matches the corresponding reference value, then the processing circuitry is configured to output a positive indication. Alternatively, if the comparison shows the data integrity value differs from the reference value, then the processing circuitry is configured to output a negative indication.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1:
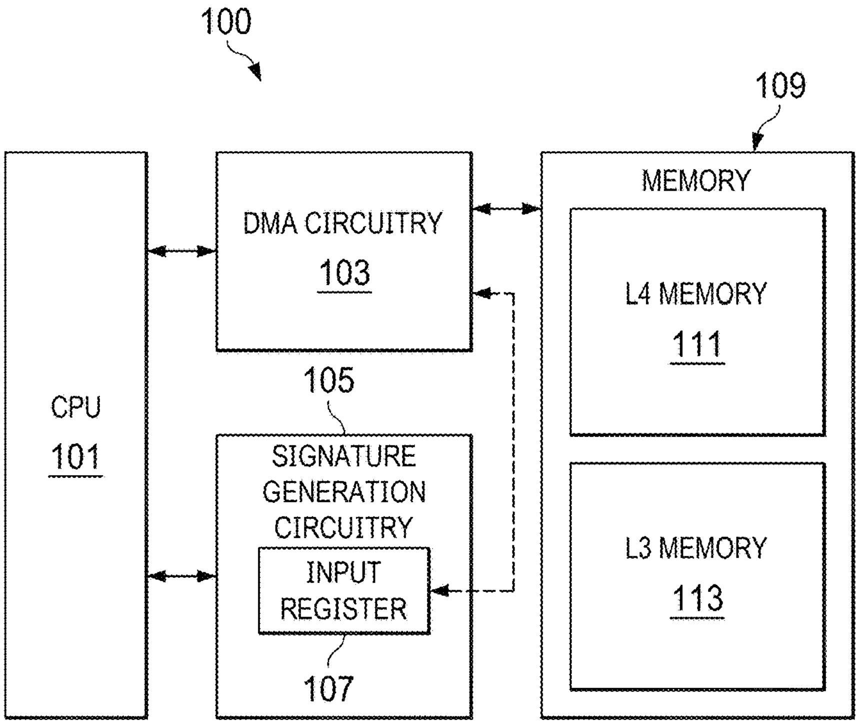
FIG. 1 illustrates an operational environment in an implementation.

Technology is disclosed herein for managing transient faults within computing systems. Transient faults are representative of temporary faults which are typically resolved by reestablishing power to the system. For example, a transient fault may be representative of a bit-flip caused by cosmic radiation to the silicon of the system. A bit-flip is representative of a type of fault where the data of a storage element is altered. For example, a memory mapped register (MMR) storing a value of "0" may be flipped to "1", or vice versa. Problematically, bit-flips can lead to downstream problems throughout the system such as missed interrupts, improper baud rates, and other flop-based challenges of the like.

Existing techniques for managing transient faults may be expensive and/or ineffective. For example, current hardware-based solutions often utilize dedicated parity bits or error checking codes (ECCs) to maintain the integrity of data in memory. Unfortunately, for regular operations, adding such redundancy may become costly. Alternatively, current software-based solutions offload data management to the central processing unit (CPU) of the system, thereby wasting execution cycles of the CPU. In contrast, disclosed herein is a new technique for managing transient faults in computing systems which relies on the direct memory access (DMA) controller of the system, and by design, reserves the execution cycles of the CPU for other functionalities.

In one example embodiment, fault detection circuitry configured to detect transient faults within memory includes a DMA controller and signature generating circuitry. The DMA controller may operate in a table-gather mode when instructed by first accessing address data from a first location in memory. The address data is representative of one or more addresses that identify a set of second locations within the memory. The memory may include caches, RAMs, non-volatile memories, ROMs, MMRs, individual flops, and/or any other suitable data storage element within the corresponding chip or coupled thereto. For example, the address data may be representative of an address that identifies a location of an MMR. Alternatively, the address data may be representative of multiple addresses that identify the locations of multiple MMRs. Next, the DMA controller is configured to access data from the second location in memory. For example, the DMA controller may access data from the one or more MMR locations. Finally, the DMA controller is configured to provide the accessed data to an input of signature generation circuitry. For example, the DMA controller may supply the data to an input register of the signature generation circuitry.

The signature generation circuitry is representative of circuitry that when triggered, is configured to generate one or more signatures based on the provided data. For example, the signature generation circuitry may be representative of cyclic redundancy check (CRC) circuitry configured to generate one or more CRC values. In an implementation, the signature generation circuitry is configured to output the generated signatures to processing circuitry configured to perform a data integrity process. For example, the signature generation circuitry may provide the one or more signatures to a CPU configured to execute the data integrity process.

In an implementation, to perform the data integrity process, the CPU is first configured to perform a comparison between the one or more signatures and one or more corresponding reference values. For example, if the signature generation circuitry generated a CRC value, then the CPU may perform a comparison between the generated CRC value and a corresponding golden signature. Next, the CPU is configured to output an indication of the comparison. If the comparison shows the one or more signatures matches the one or more corresponding reference values, then the CPU is configured to output a positive indication. Alternatively, if the comparison shows at least one of the one or more signatures does not match the corresponding reference value, then the CPU is configured to output a negative indication. For example, if the comparison is between a CRC value and a corresponding golden signature, then the CPU will output a positive indication when the CRC value matches the corresponding golden signature. Else, the CPU will output a negative indication In an implementation, the CPU is configured to output a warning for when the CPU outputs a negative indication. For example, the CPU may inform an associated software module that a transient fault needs to be addressed. In another implementation, the CPU is configured to enter a safety mode for when the CPU outputs a negative indication. For example, the CPU may instruct an associated software module to perform a system reset for when a transient fault is detected.

Advantageously, the proposed technology offloads data movement operations related to error checking from the CPU to the DMA controller, thereby reserving the execution cycles of the CPU for other system functionalities. Furthermore, the proposed technology provides a hardware-based solution for addressing flop-based challenges within the system. As a result, the proposed technology is more efficient and less costly at detecting transient faults than other software or hardware-based solutions.

Now turning to the figures, FIG. 1 illustrates operating environment 100 in an implementation. Operating environment 100 is representative of an example environment configurable to detect transient faults in the background of normal operations. For example, operating environment 100 may be representative of an integrated circuit device and/or system configured to maintain the integrity of data stored in memory during the course of normal system operations. Operating environment 100 includes, but is not limited to, CPU 101, direct memory access (DMA) circuitry 103, signature generation circuitry 105, and memory 109.

CPU 101 is representative of processing circuitry configured to perform various functionalities. For example, in the automotive context, CPU 101 may be representative of one or more processing cores, which are coupled to memory 109, and configured to execute program instructions related to motor control, airbag deployment, and/or other functionalities of the like. In an implementation, CPU 101 is further representative of circuitry configured to execute program instructions related to transient fault detection in memory 109. For example, CPU 101 may be representative of processing circuitry configured to execute a data integrity process. The data integrity process may be representative of software, executed by CPU 101, for detecting transient faults within the data of memory 109. In an implementation, to gather the necessary data for performing the data integrity process, CPU 101 instructs DMA circuitry 103 to access the necessary data for performing the data integrity process from memory 109 and provide the data to an input of signature generation circuitry 105.

DMA circuitry 103 is representative of circuitry configured to access data from, and store data to, memory 109. For example, DMA circuitry 103 may gather data from memory 109 and provide the data to a register of CPU 101. Alternatively, DMA circuitry 103 may store data generated by CPU 101 within a location of memory 109 and/or within other components of operating environment 100. In an implementation, DMA circuitry 103 is also representative of circuitry configured to collect input data for performing the data integrity process. For example, when CPU 101 executes a specific instruction from memory 109 or encounters another trigger, CPU 101 may cause DMA circuitry 103 to gather data from memory 109 and provide the data to input register 107.

Input register 107 is representative of a register which stores input data for signature generation circuitry 105. For example, DMA circuitry 103 may transfer data from a first location in memory 109 to input register 107 for processing by signature generation circuitry 105. It should be noted that, in other implementations, input register 107 is not a part of signature generation circuitry 105 but is instead a register of memory 109.

Signature generation circuitry 105 is representative of circuitry configured to generate data integrity values with respect to the data of input register 107. For example, signature generation circuitry 105 may be representative of CRC circuitry configured to generate CRC values. A data integrity value is representative of a signature which allows CPU 101 to evaluate the integrity of data within memory 109. For example, CPU 101 may utilize a generated data integrity value to detect a bit-flip within a storage element of memory 109. It should be noted that signature generation circuitry 105 should not be limited to CRC circuitry exclusively and may instead be representative of an alternative form of signature generation circuitry configured to generate signatures based on the data of memory 109.

Memory 109 is representative of one or more volatile or non-volatile computer-readable storage media including instructions, data, and the like. For example, memory 109 may include a memory hierarchy (e.g., a hierarchy of caches, RAMs, non-volatile memories, ROMs), distributed memory devices (e.g., MMRs, individual flops), and/or any other suitable data storage element within the operating environment 100 or coupled thereto. Memory 109 may include, but is not limited to, L4 memory 111 and L3 memory 113.

L4 memory 111 is representative of a location within memory 109 for storing data. For example, L4 memory 111 may be representative of static random-access memory (SRAM) configured to store instructions, data, and the like. In an implementation, L4 memory 111 is representative of a memory configured to store address data. For example, L4 memory 111 may store a table of address data corresponding to multiple memory mapped registers (MMRs).

L3 memory 113 is representative of another location within memory 109 for storing data. For example, L3 memory 113 may also be representative of an SRAM configured to store instructions, data, and the like. In an implementation, L3 memory 113 is configured to store at least some of the data which corresponds to the address data of L4 memory 111.

Figure 2:
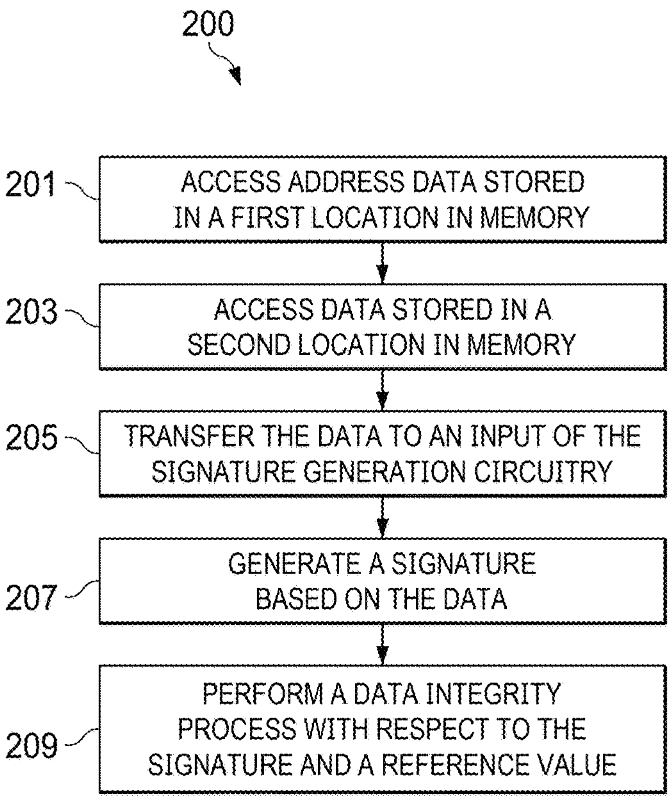
FIG. 2 illustrates a data integrity method in an implementation.

FIG. 2 illustrates data integrity method 200 in an implementation. Data integrity method 200 may be implemented using software to be executed by a computing system, hardcoded logic, and/or combination thereof to detect transient faults within the storage elements of the system. Data integrity method 200 may be implemented in the context of program instructions that, when executed by a suitable computing system, direct the processing circuitry of the computing system to operate as follows, referring parenthetically to the steps in FIG. 2. For the purposes of explanation, data integrity method 200 will be explained with the elements of FIG. 1. This is not meant to limit the applications of data integrity method 200, but rather to provide an example.

To begin, an instruction, timer, or other event may cause a processor core of CPU 101 to cause DMA circuitry 103 to access (e.g., read) address data stored by a first location of memory 109. The address data may correspond to one or more data storage elements, such as MMRs, flops, caches, RAMs, non-volatile memories, ROMs, etc. (step 201). For example, DMA circuitry 103 may access address data from L4 memory 111, such that the address data is representative of the addresses of one or more MMRs. For the purposes of explanation, only a singular MMR location will be discussed herein. This is not meant to limit the applications of the proposed technology, but rather to provide an example.

Next, DMA circuitry 103 accesses (e.g., reads) data stored by a second location of memory 109, such that the second location corresponds to the previously accessed address data (step 203). For example, if DMA circuitry 103 first accesses address data of an MMR location, then DMA circuitry 103 will access the data that is stored by the corresponding MMR. In an implementation, to access the data, DMA circuitry 103 evaluates L3 memory 113 to identify the MMR location with an address that corresponds to the accessed address data.

After accessing the data as identified by the address data, DMA circuitry 103 transfers the accessed data to an input of signature generation circuitry 105 (step 205). For example, DMA circuitry 103 may transfer the accessed data to input register 107 to trigger signature generation circuitry 105 to generate a signature, such as a CRC value, with respect to the data (step 207). In some examples, the DMA circuitry 103 supports a table gather mode in which the DMA circuitry 103 performs steps 201-205 in response to a single table gather command from CPU 101

Once generated, signature generation circuitry 105 may output the signature to CPU 101, and in response CPU 101 may execute the data integrity process with respect to the signature and a corresponding reference value (step 209). The reference value may be a signature obtained in a previous iteration or a previously authenticated signature stored during downloading or updating a set of software and/or firmware.

In an implementation, to perform the data integrity process, CPU 101 is configured to perform a comparison between the signature and a corresponding reference value. For example, CPU 101 may perform the comparison between the signature and a corresponding golden signature. If the comparison shows the signature matches the corresponding reference value, then CPU 101 is configured to output a positive indication. Alternatively, if the comparison shows the signature does not match the corresponding reference value, then CPU 101 is configured to output a negative indication. In an implementation, if the comparison shows the signature does not match the corresponding reference value, then CPU 101 is configured to output a warning, such that the warning is indicative of the identified transient fault.

Figure 3:
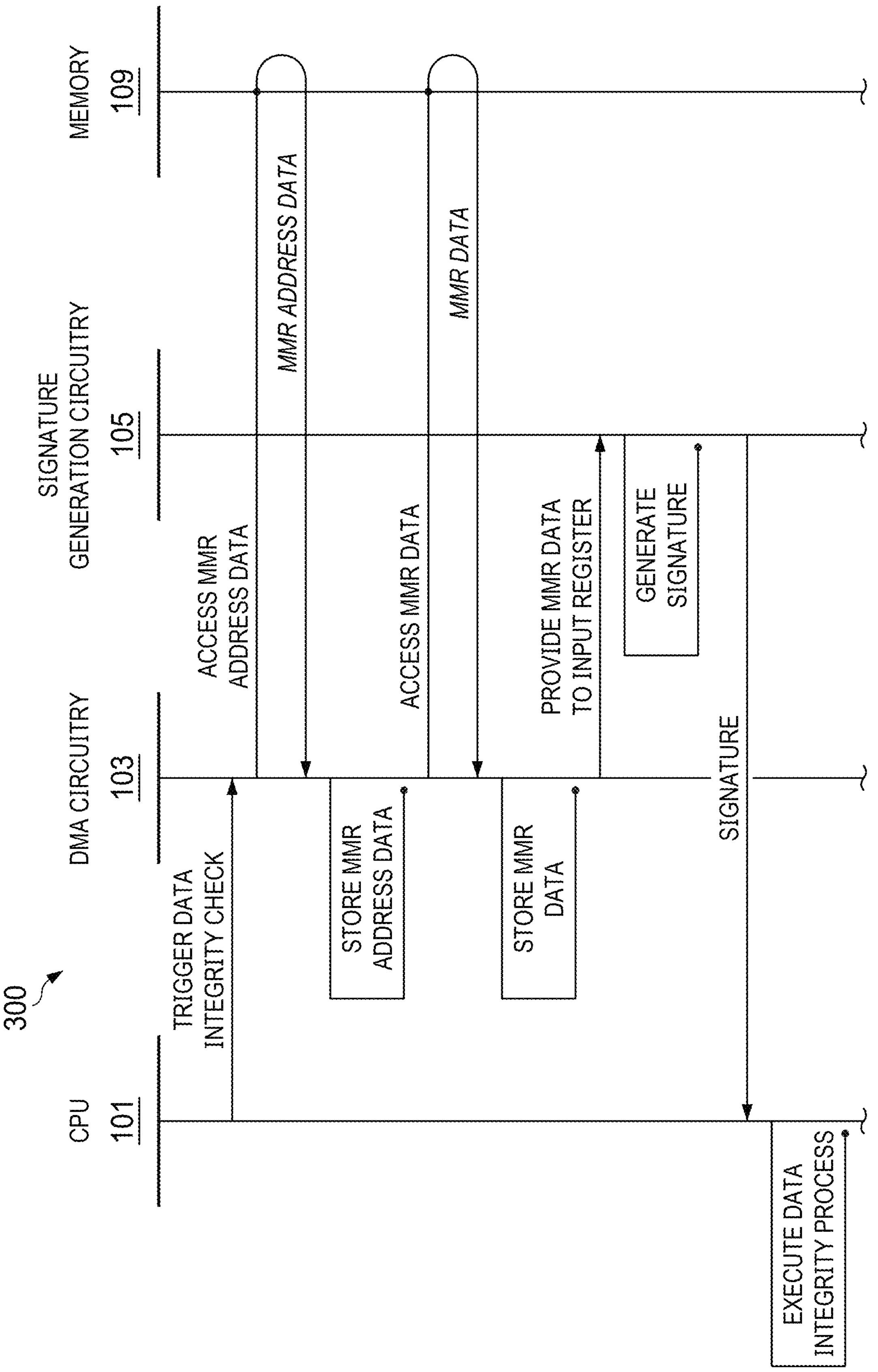
FIG. 3 illustrates an operational sequence in an implementation.

FIG. 3 illustrates operational sequence 300 in an implementation. Operational sequence 300 is representative of a sequence for detecting transient faults with respect to the elements of FIG. 1. As such, operational sequence 300 includes CPU 101, DMA circuitry 103, signature generation circuitry 105, and memory 109.

To begin, CPU 101 triggers DMA circuitry 103 to perform a data integrity check. For example, CPU 101 may instruct DMA circuitry 103 to execute steps 201, 203, and 205 of data integrity method 200. In an implementation, to perform the data integrity check, CPU 101 first provides an indication to which data requires a data integrity check to DMA circuitry 103, and in response, DMA circuitry 103 to accesses the indicated data from memory 109. For example, DMA circuitry 103 may access address data from L4 memory 111, such that the address data is indicative of an MMR location that stores data in need of a data integrity check.

Next, after accessing the address data from L4 memory 111, DMA circuitry 103 stores the accessed address data in a temporary location. For example, DMA circuitry 103 may store the accessed address data within a register of DMA circuitry 103. Next, DMA circuitry 103 analyzes the accessed address data to identify a corresponding MMR location within memory 109. For example, DMA circuitry 103 may analyze L3 memory 113 to identify an MMR location with an address the corresponds to the accessed address data.

Upon identifying the corresponding MMR location, DMA circuitry 103 accesses the data from the MMR location and stores the accessed data in a temporary location. For example, DMA circuitry 103 may store the accessed data within another register of DMA circuitry 103. Next, DMA circuitry 103 transfers the accessed data from the temporary location to input register 107. In response, signature generation circuitry 105 generates a signature based on the provided data and outputs the signature to CPU 101.

Next, CPU 101 executes the data integrity process. In an implementation, to execute the data integrity process, CPU 101 is configured to perform a comparison between the signature and a corresponding reference value. For example, CPU 101 may perform a comparison between the signature and a golden signature. The golden signature may have been generated during a previous iteration or predetermined offline. If the comparison shows the signature matches the corresponding reference value, then CPU 101 is configured to output a positive indication. Alternatively, if the comparison shows the signature does not match the corresponding reference value, then CPU 101 is configured to output a negative indication.

In an implementation, if CPU 101 outputs a negative indication, then CPU 101 may instruct operating environment 100 to enter a safety mode. For example, CPU 101 may instruct a software module to perform a system reset to restore the corrupted data to an original state. In other words, CPU 101 may instruct operating environment 100 to absolve the identified transient fault via a system reset.

Figure 4:
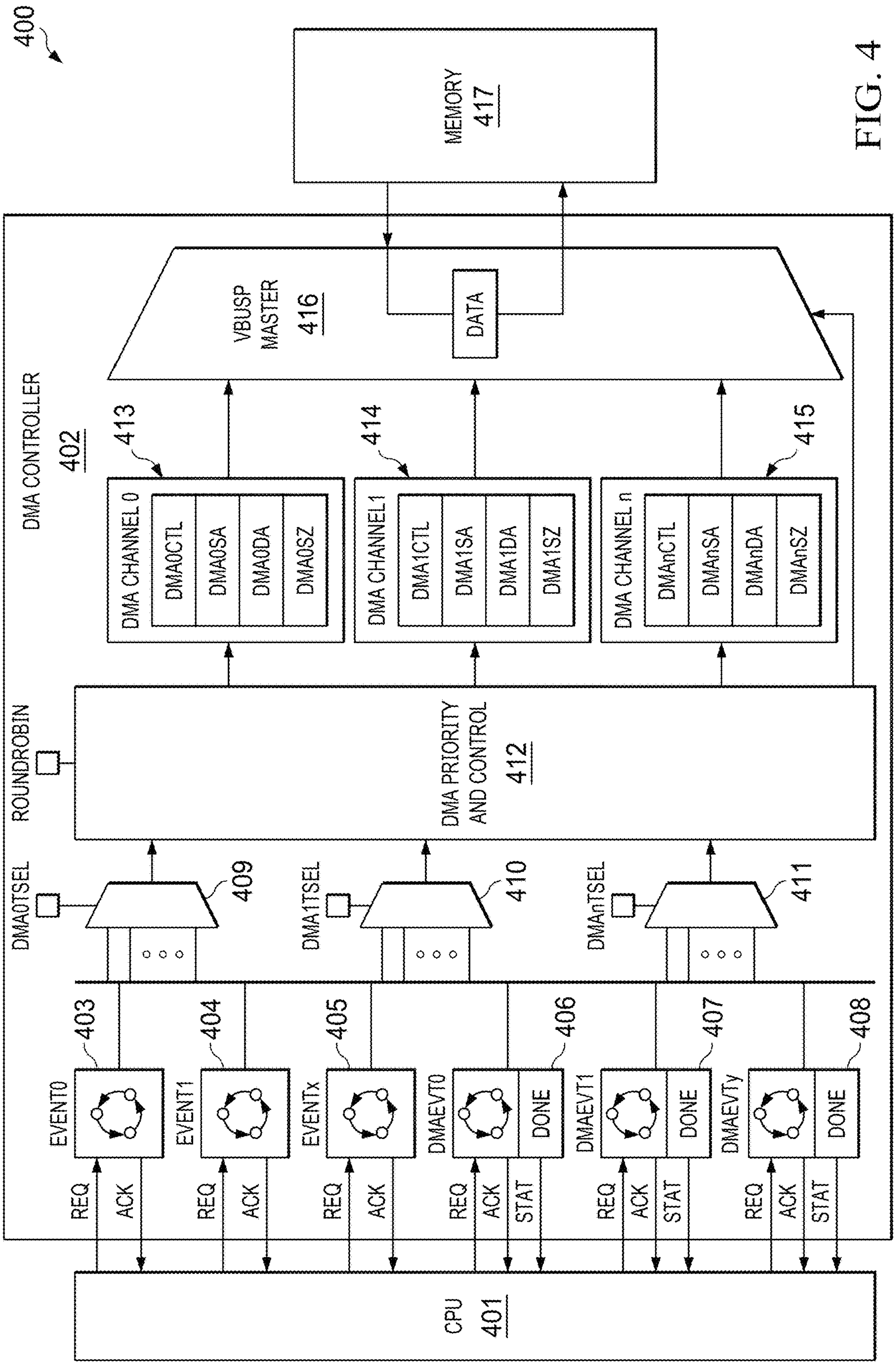
FIG. 4 illustrates a system in an implementation.

Now turning to the next Figure, FIG. 4 illustrates system 400 in an implementation. System 400 is representative of an exemplary system configured to detect transient faults in the background of normal operations. For example, system 400 may be representative of operating environment 100 of FIG. 1. System 400 includes, but is not limited to, CPU 401, DMA controller 402, and memory 417.

CPU 401 is representative of processing circuitry configured to execute program instructions for performing various functionalities. For example, CPU 401 may be representative of CPU 101 of FIG. 1. In an implementation, CPU 401 is representative of circuitry configured to trigger a direct memory access (DMA) controller to enter various operational modes. For example, CPU 401 may trigger DMA controller 402 to enter a normal mode or a data integrity mode. The normal mode is representative of a mode where DMA controller 402 is triggered to access data from memory 417 or store data to memory 417. Alternatively, the data integrity mode is representative of a mode where DMA controller 402 is configured to access data for performing a data integrity check. For example, the data integrity mode may be representative of a CRC mode. In an implementation, CPU 401 outputs events 403, 404, 405, 406, 407, and 408 to trigger DMA controller 402 to enter a designated operational mode.

Events 403, 404, 405, 406, 407, and 408 are representative of requests, generated by CPU 401, which trigger DMA controller 402 to enter various operational modes. For example, CPU 401 may output events 403, 404, and 405 to cause DMA controller 402 to enter the normal mode and either retrieve data from or store data to memory 417. Alternatively, CPU 401 may output events 406, 407, and 408 to cause DMA controller 402 to enter the data integrity mode and retrieve data from memory 417 for performing a data integrity check.

A data integrity check is representative of a process for identifying transient faults within the storage elements of system 400. In an implementation, CPU 401 routinely outputs requests related to data integrity checks. For example, CPU 401 may output events 406, 407, and 408 in regular intervals (e.g., every second). It should be noted that, while only six events are illustrated, CPU 401 may be configured to output more, or less, requests to DMA controller 402.

DMA controller 402 is representative of circuitry configured to manage the data stored by memory 417. For example, DMA controller 402 may be representative of DMA circuitry 103 of FIG. 1. In an implementation, DMA controller 402 is configured to enter various operational modes, and in turn perform various functionalities, based on the event requests received from CPU 401. For example, CPU 401 may output events 403, 404, 405, 406, 407, and 408 to DMA controller 402, and in response, DMA controller 402 may enter the appropriate operational mode and either, store data to or access data from memory 417. DMA controller 402 includes, but is not limited to, selection circuitries 409, 410, and 411, control circuitry 412, channels 413, 414, and 415, and bus master 416.

Selection circuitries 409, 410, and 411 are representative of circuitries configured to determine an order of operations for executing various event requests. For example, selection circuitries 409, 410, and 411 may receive events 403, 404, 405, 406, 407, and 408 from CPU 401, and in response, determine an order of operations for executing the received requests. In an implementation, selection circuitries 409, 410, and 411 provide acknowledgments to CPU 401 when an event request was received. For example, after receiving event 406, selection circuitry 410 may output an acknowledgment to CPU 401, such that the acknowledgment indicates the event request was received. In another implementation, selection circuitries 409, 410, and 411 are further configured to provide a status to CPU 401 for events related to data integrity checks. For example, after the execution of event 406, selection circuitry 410 may output a status to CPU 401, such that the status indicates the necessary data for performing the data integrity check is accessible to CPU 401. In an implementation, selection circuitries 409, 410, and 411 prioritize events related to data integrity checks. For example, if selection circuitry 410 receives events 405 and 406, then selection circuitry 409 will output event 406 to control circuitry 412 prior to outputting event 405.

Control circuitry 412 is representative of circuitry configured to determine the appropriate channel for executing various events. For example, control circuitry 412 may receive events 403, 404, 405, 406, 407, and 408 from selection circuitries 409, 410, and 411, and in response, determine a channel (i.e., channel 413, 414, or 415) for executing the specified event. In an implementation, control circuitry 412 comprises one or more queues for storing events to be executed. For example, control circuitry 412 may comprise three queues, such that the first queue is configured to store events for channel 413, the second queue is configured to store events for channel 414, and the third queue is configured to store events for channel 415.

Channels 413, 414, and 415 are representative of DMA channels configured to operate in various operational modes. For example, channel 413 may be representative of a DMA channel configured to operate under the normal mode. Meaning channel 413 may be configured to store data to or retrieve data from memory 417. Alternatively, channels 414 and 415 may be representative of DMA channels configured to operate under the data integrity mode. For example, channel 414 may be representative of a DMA channel configured to determine if UART communications are being appropriately conducted, while channel 415 may be representative of a DMA channel configured to determine if SPI communications are being appropriately conducted. In an implementation, channels 414 and 415 are triggered to access data for performing a data integrity check when said communications occur. For example, channel 414 may be triggered to access data related to UART communications when CPU 401 utilizes UART communication techniques. Similarly, channel 415 may be triggered to access data related to SPI communications when CPU 401 utilizes SPI communication techniques.

In an implementation, the number of tasks DMA controller 402 can perform is based on the number of DMA channels DMA controller 402 comprises. For example, since DMA controller 402 includes channels 413, 414, and 415, then DMA controller 402 may be configured to perform three separate tasks. It should be noted that, although illustrated as such, DMA controller 402 is not limited to three channels, and may instead comprise numerous channels for performing numerous tasks.

In an implementation, channels 413, 414, and 415 each comprise multiple buffers for storing various data types. For example, channels 413, 414, and 415, may each comprise a source address buffer, a destination address buffer, and a data size buffer. The source address buffer is representative of a buffer which stores an address that is indicative of a location for gathering data. The destination address buffer is representative of a buffer which stores an address that is indicative of a location for outputting the gathered data. The size buffer is representative of a buffer which stores the size of the data that is being transferred from the source address location to the destination address location. In an implementation, channels 413, 414, and 415, also comprise a local memory for storing control logic. For example, channel 413 may comprise a local memory for storing control logic for operating under the normal mode, while channels 414 and 415 may comprise a local memory for storing control logic for operating under the data integrity mode.

In an implementation, channels 413, 414, and 415 receive event requests from control circuitry 412, and in response, identify one or more source address locations and one or more destination address locations for performing the event requests. For example, channel 414 may receive event request 406, and in response, identify a source address location and a destination address location for accessing the necessary data for performing the data integrity check of event request 406. In an implementation, upon identifying the source address locations and the destination address locations, channels 413, 414, and 415 are configured to provide the identified locations to bus master 416.

Bus master 416 is representative of circuitry configured to interact with memory 417. For example, bus master 416 may be representative of DMA circuitry 103 of FIG. 1. In an implementation, bus master 416 is configured to transfer data from a source address location to a destination address location, based on instructions received from channels 413, 414, and 415. For example, bus master 416 may transfer data from memory 417 to CPU 401, or vice versa. In an implementation, bus master 416 comprises a local memory for storing data. For example, after accessing data from a source address location, bus master 416 may store the data in a local memory before transferring the data to a destination address location.

In an implementation, bus master 416 is configured to gather data for performing a data integrity check. For example, when triggered by the appropriate channel, bus master 416 may first access address data from a source address location and store the accessed address data within its local memory. Next, bus master 416 may analyze the address data to identify a location within memory 417 that stores data which requires a data integrity check. Once identified, bus master 416 may access the identified data and transfer the data to a destination address location, such that the destination address location is representative of an input to circuitry configured to perform the data integrity check. For example, the destination address location may be representative of an input to signature generation circuitry (e.g., input register 107) configured to generate signatures based on the data. It should be noted that, the destination address location may be representative of location within, or outside of, memory 417.

Memory 417 is representative of one or more volatile or non-volatile computer-readable storage media including instructions, data, and the like. For example, memory 417 may be representative of memory 109 of FIG. 1. In an implementation, memory 417 includes a first location (e.g., L4 memory 111) configured to store address data, and a second location (e.g., L3 memory 113) configured to store corresponding data. For example, memory 417 may include a first location which stores the address data of multiple MMRs, and a second location which stores the data of the multiple MMRs. In an implementation, memory 417 also includes an input location configured to trigger circuitry to generate a data integrity value. For example, the input location may be representative of an input register to signature generation circuitry configured to generate a data integrity value and output the generated value to CPU 401. In response, CPU 401 is configured to perform the data entry check with respect to the data integrity value and a corresponding reference value.

In an implementation, to perform the data integrity check, CPU 401 is configured to compare the data integrity value to a corresponding reference value. For example, CPU 401 may compare the data integrity value to a corresponding golden signature. If the comparison shows the data integrity value matches the golden signature, then CPU 401 is configured to output a positive indication. Else, CPU 401 is configured to output a negative indication. In an implementation, the negative indication is representative of a warning that indicates a transient fault is currently present in memory 417.

Figure 5:
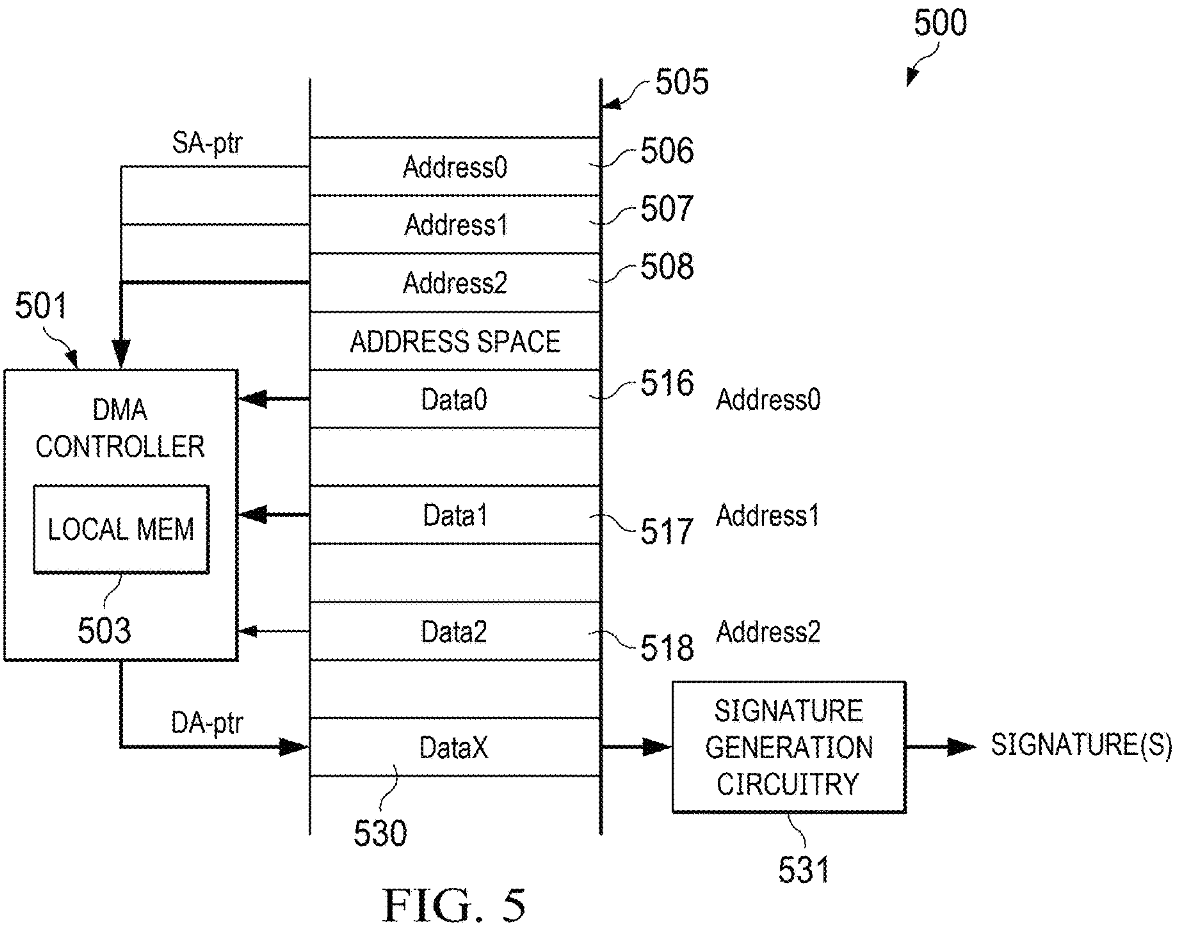
FIG. 5 illustrates another operational environment in an implementation.

FIG. 5 illustrates operating environment 500 in an implementation. Operating environment 500 is representative of an example environment configurable to maintain the integrity of data within memory. For example, operating environment 500 may be representative of circuitry configured to perform a data integrity check with respect to the data stored in memory. Operating environment 500 includes DMA controller 501, table 505, and signature generation circuitry 531.

DMA controller 501 is representative of circuitry configured to manage the data stored in memory. For example, DMA controller 501 may be representative of DMA circuitry 103 of FIG. 1 or DMA controller 402 of FIG. 4. In an implementation, DMA controller 501 is representative of a controller configured to access data for performing a data integrity check. A data integrity check is representative of a process for identifying transient faults within memory. For example, a data integrity check may be representative of a process, executed by a CPU coupled to DMA controller 501, for identifying transient faults within the data of table 505. DMA controller 501 includes, but is not limited to, local memory 503.

Local memory 503 is representative of a memory configured to store data for DMA controller 501. For example, local memory 503 may be representative of a buffer, configured to store address data corresponding to a location within table 505. In an implementation, DMA controller 501 is configured to read data from a source pointer location and write the data to local memory 503. The source pointer location is representative of a location within table 505 that DMA controller 501 must read data from. For example, the source pointer location may be representative of a row within table 505.

Table 505 is representative of a table, stored in memory (e.g., memory 109 or 417), which is configured to store data related to multiple MMR locations. For example, table 505 may be configured to store address data of multiple MMR locations and data of the multiple MMR locations. Table 505 includes address rows 506, 507, and 508, register rows 516, 517, and 518, and input row 530. It should be noted that table 505 is not limited to the illustrated rows and may instead include numerous rows for storing data of numerous MMRs.

Address rows 506, 507, and 508 are representative of rows within table 505 which store address data of multiple MMR locations. For example, address row 506 may store the address of a first MMR location (i.e., "Address0"), address row 507 may store the address of a second MMR location (i.e., "Address1"), and address row 508 may store the address of a third MMR location (i.e., "Address2"). In an implementation, address rows 506, 507, and 508 store address data which is indicative of a secondary location within table 505. For example, address row 506 stores an address indicative of register row 516, address row 507 stores an address indicative of register row 517, and address row 508 stores an address indicative of register row 518.

Register rows 516, 517, and 518 are representative of rows within table 505 which store data of the multiple MMR locations. For example, register row 516 may store data of the first MMR location (i.e., "Data0"), register row 517 may store data of the second MMR location (i.e., "Data1"), and register row 518 may store data of the third MMR location (i.e., "Data2"). In an implementation, the addresses of register rows 516, 517, and 518 respectively correspond to the address data of address rows 506, 507, and 508. For example, the address of register row 516 corresponds to the address data of address row 506, the address of register row 517 corresponds to the address data of address row 507, and the address of register row 518 corresponds to the address data of address row 508.

Input row 530 is representative of a row within table 505 which stores data that requires a data integrity check. For example, when instructed, DMA controller 501 may read data from one or more register rows and write the data to input row 530. Once stored, signature generation circuitry 531 is triggered to access the data from input row 530 and generate one or more signatures based on the data.

Signature generation circuitry 531 is representative of circuitry configured to generate signatures. A signature is representative of a value which describes the integrity of data, such as a CRC signature. In an implementation, when triggered, signature generation circuitry 531 is configured to generate a signature, based on the data of input row 530, and provide the signature to a CPU. In response, the CPU is configured to perform the data integrity check with respect to the provided signature, later discussed with reference to FIG. 8.

Figure 6:
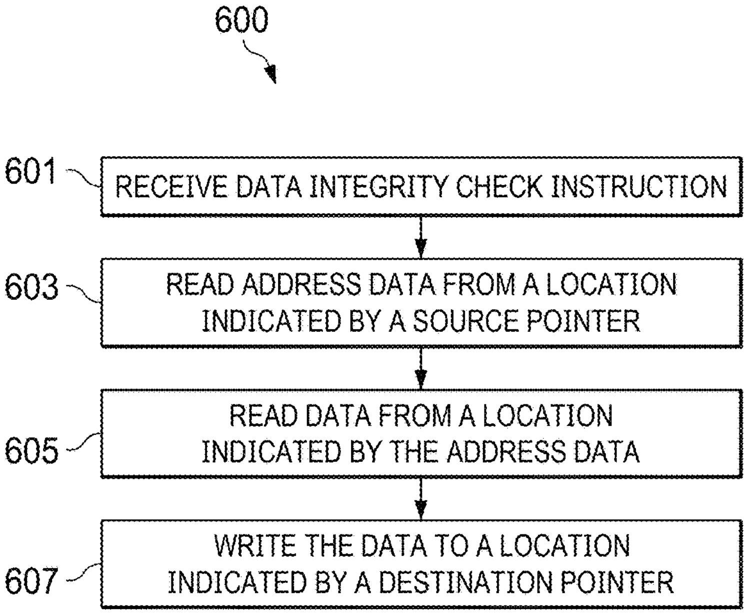
FIG. 6 illustrates a direct memory access (DMA) process in an implementation.

FIG. 6 illustrates DMA process 600 in an implementation. DMA process 600 may be implemented using software, hardcoded logic, and/or combination thereof to detect transient faults. For example, DMA process 600 may be representative of data integrity method 200 of FIG. 2. DMA process 600 may be implemented in the context of program instructions that, when executed by a suitable computing system, direct the processing circuitry of the computing system to operate as follows, referring parenthetically to the steps in FIG. 6. For the purposes of explanation, DMA process 600 will be explained with the elements of FIG. 5. This is not meant to limit the applications of DMA process 600, but rather to provide an example.

To begin, DMA controller 501 receives an instruction from an associated CPU (e.g., CPU 401), such that the instruction directs DMA controller 501 to access data for performing a data integrity check (step 601). For example, DMA controller 501 may receive an event request from an associated CPU, such that the event request identifies a source pointer location and a destination pointer location. The source pointer location is representative of one or more locations that DMA controller 501 must read from, while the destination pointer location is representative of a location that DMA controller 501 must write to. For example, the source pointer location may be representative of address rows 506, 507 and 508, while the destination pointer location may be representative of input row 530.

Next, DMA controller 501 reads the address data from table 505 based on the location of the source pointer (step 603). For example, if the source pointer location is representative of address row 506, then DMA controller 501 reads the address data (i.e., "Address0") from address row 506, and stores the address data in local memory 503. In an implementation, DMA controller 501 is configured to evaluate the address data stored by local memory 503 to identify a row within table 505 that has the corresponding address. For example, if local memory 503 is currently storing "Address0", then DMA controller 501 may identify register row 516 as having the corresponding address.

Next, DMA controller 501 reads data from table 505 based on the address data stored in local memory 503 (step 605) and writes the data to the destination pointer location (step 607). For example, if local memory 503 is currently storing "Address0", then DMA controller 501 may read the data (i.e., "Data0") from register row 516, and write the data to input row 530. In some examples, the DMA controller 501 supports a table gather mode in which the DMA controller 501 performs steps 601-605 in response to a single table gather command from CPU 101.

Once stored by input row 530, signature generation circuitry 531 may generate one or more signatures based on the data stored by input row 530. For example, if input row 530 stores "Data0", then signature generation circuitry 531 may generate a signature based on "Data0". In an implementation, after generating the one or more signatures, signature generation circuitry 531 outputs the one or more signatures to an associated CPU (e.g., CPU 101 or CPU 401). In response, the associated CPU performs the data integrity check with respect to the one or more signatures.

Figure 7:
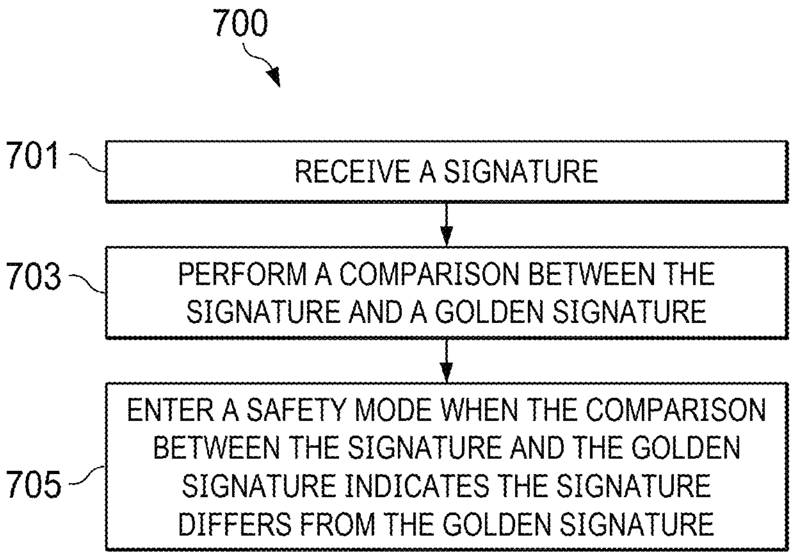
FIG. 7 illustrates a data integrity process in an implementation.

FIG. 7 illustrates data integrity process 700 in an implementation. Data integrity process 700 may be implemented using software, hardcoded logic, and/or combination thereof to detect transient faults within the storage elements of a system. Data integrity process 700 may be implemented in the context of program instructions that, when executed by a suitable computing system, direct the processing circuitry of the computing system to operate as follows, referring parenthetically to the steps in FIG. 7. For the purposes of explanation, data integrity process 700 will be explained as a process for detecting transient faults within the data gathered via DMA process 600 (with respect to the elements of FIG. 5). This specification is not meant to limit the applications of data integrity process 700, but rather to provide an example.

To begin, a CPU associated with operating environment 500 receives one or more signatures from signature generation circuitry 531 (step 701). For example, if signature generation circuitry 531 generates a signature with respect to "Data0", then signature generation circuitry 531 will output the "Data0" signature to the associated CPU. For the purposes of explanation, data integrity process 700 will be explained with respect to a singular signature. This is not meant to limit the applications of data integrity process 700, but rather to provide an example.

Next, the associated CPU is configured to perform a comparison between the signature and a corresponding golden signature (step 703). A golden signature is representative of uncorrupted data which the CPU may utilize to identify transient faults. In an implementation, DMA controller 501 in conjunction with signature generation circuitry 531 is configured to generate golden signatures for the data of table 505. For example, DMA controller 501 may instruct signature generation circuitry 531 to generate signatures for register rows 516, 517, and 518 and store the signatures as golden signatures within a location in memory. During operation, the associated CPU may access the golden signatures from memory to perform the comparison between the signature and the corresponding golden signature.

If the comparison shows the signature matches the corresponding golden signature, then the CPU is configured to output a positive indication. Alternatively, if the comparison shows the signature does not match the corresponding golden signature, then the CPU is configured to output a negative indication. In an implementation, if the CPU outputs a negative indication, then the CPU is configured to enter a safety mode (step 705). For example, if the CPU outputs a negative indication, then the CPU may output a warning indicative of the identified transient fault. In another example, if the CPU outputs a negative indication, then the CPU may perform a system reset, and in turn, absolve the transient faults within table 505.

Figure 8:
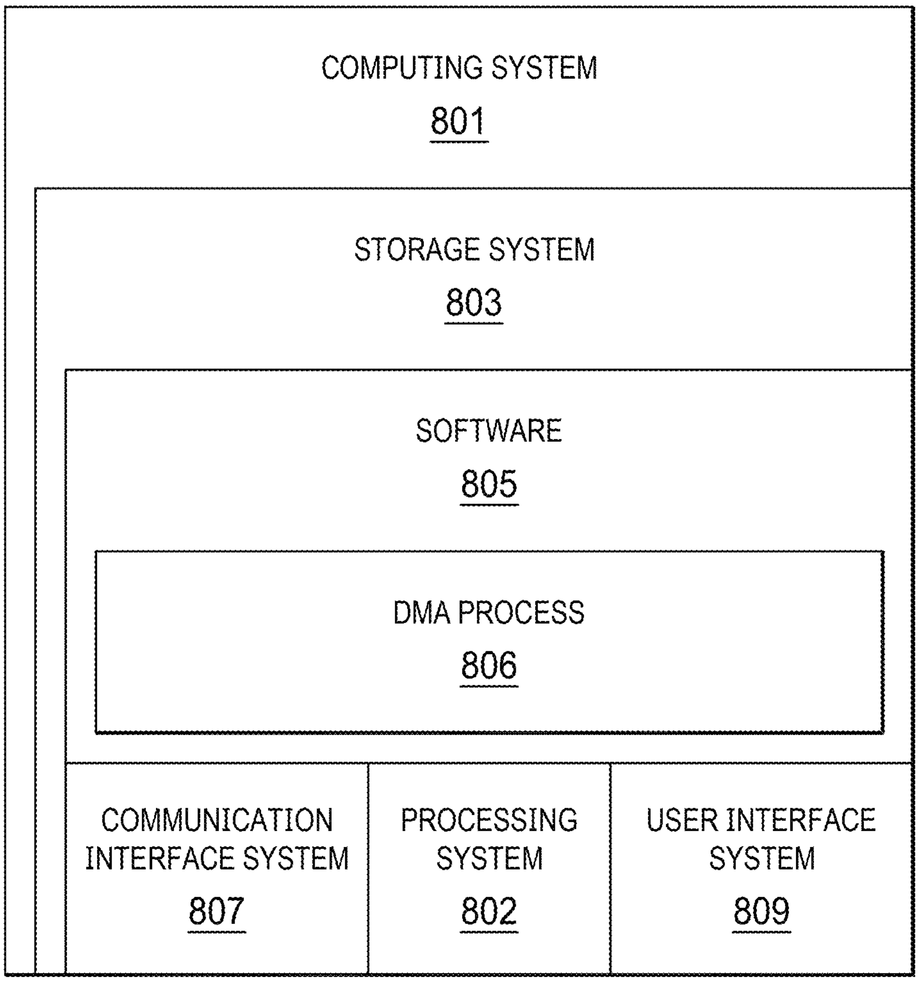
FIG. 8 illustrates a computing system suitable for implementing the various operational environments, architectures, processes, scenarios, and sequences discussed below with respect to the other Figures.

FIG. 8 illustrates an example computer system that may be used in various implementations. For example, computing system 801 is representative of a computing device capable of identifying transient faults during normal operations as described herein. Computing system 801 is representative of any system or collection of systems with which the various operational architectures, processes, scenarios, and sequences disclosed herein for detecting and resolving transient faults within the storage elements of computing system 801 may be employed. Examples of computing system 801 include—but are not limited to—micro controller units (MCUs), embedded computing devices, server computers, cloud computers, personal computers, mobile phones, and the like.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809 (optional). Processing system 802 is operatively coupled with storage system 803, communication interface system 807, and user interface system 809. Computing system 801 may be representative of a cloud computing device, distributed computing device, or the like.

Processing system 802 loads and executes software 805 from storage system 803, or alternatively, runs software 805 directly from storage system 803. Software 805 includes program instructions, which includes DMA process 806 (e.g., data integrity method 200, DMA process 600, or data integrity process 700). When executed by processing system 802, software 805 directs processing system 802 to operate as described herein for at least the various processes, operational scenarios, and sequences discussed in the foregoing implementations. Computing device 801 may optionally include additional devices, features, or functions not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, digital signal processing units, data processing units, application specific processors, and logic devices, as well as any other type of processing device, combinations, or variations thereof.

Storage system 803 may comprise any computer readable storage media readable and writeable by processing system 802 and capable of storing software 805. Storage system 803 may include volatile and nonvolatile, removable and non-removable, mutable and non-mutable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support binary convolution operations. Indeed, encoding software 805 (and DMA process 806) on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary, etc.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A circuit comprising:
a direct memory access (DMA) controller configured to:
access address data stored in a first location in a first memory, wherein the address data is indicative of a second location in a second memory; and
access data stored in the second location; and
signature generation circuitry coupled to the DMA controller and configured to:
receive the data from the DMA controller; and
generate a data integrity value based on the data.

2. The circuit of claim 1 further comprising processing circuitry coupled to the signature generation circuitry and configured to:
perform a comparison between the data integrity value and a reference value; and
output an indication based on the comparison between the data integrity value and the reference value.

3. The circuit of claim 2, wherein the processing circuitry is further configured to:
output a positive indication when the data integrity value matches the reference value; and
output a negative indication when the data integrity value does not match the reference value.

4. The circuit of claim 2, wherein the signature generation circuitry includes cyclic redundancy check (CRC) circuitry, wherein the data integrity value is a CRC value.

5. The circuit of claim 1, wherein prior to accessing the address data, the DMA controller is further configured to receive a data integrity check instruction.

6. The circuit of claim 1, wherein the address data corresponds to memory mapped register (MMR) locations and wherein the data corresponds to data of the MMR locations.

7. The circuit of claim 1, wherein the DMA controller includes:
- a source pointer configured to point at the first location in the first memory; and
- a destination pointer configured to point at a third location in the signature generation circuitry.

8. A device comprising:
- at least one processor core; and
- a direct memory access (DMA) controller coupled to the at least one processor core; and
- a signature generation circuitry;
- wherein the DMA controller is configured to, in response to a table command from the at least one processor core:
  - access address data stored in a first location in a first memory, wherein the address data is indicative of a second location in a second memory;
  - access data stored in the second location of the second memory; and
  - transfer the data to the signature generation circuitry.

9. The device of claim 8, wherein:
- the signature generation circuitry is configured to:
  - generate a CRC value based on the data; and
  - output the CRC value to the at least one processor core; and
- the at least one processor core is configured to:
  - perform a comparison between the CRC value and a reference value; and
  - output an indication based on the comparison between the CRC value and the reference value.

10. The device of claim 9, wherein the at least one processor core is further configured to:
- output a positive indication when the comparison shows the CRC value matches the reference value; and
- output a negative indication when the comparison shows the CRC value does not match the reference value.

11. The device of claim 10, wherein the reference value is a golden signature and wherein the signature generation circuitry is configured to generate the golden signature.

12. The device of claim 8, wherein the address data corresponds to memory mapped register (MMR) locations and wherein the data corresponds to data of the MMR locations.

13. The device of claim 8, wherein the DMA controller includes a source pointer and a destination pointer.

14. The device of claim 13, wherein the source pointer is configured to point at the first location in the first memory and wherein the destination pointer is configured to point at a third location in the signature generation circuitry.

* * * * *